(12) United States Patent
Nellen et al.

(10) Patent No.: US 9,931,919 B2
(45) Date of Patent: Apr. 3, 2018

(54) OPEN ROOF CONSTRUCTION FOR A VEHICLE

(71) Applicant: Inalfa Roof Systems Group B.V., Oostrum (NL)

(72) Inventors: Marcel Johan Christiaan Nellen, Merselo (NL); Rainer Gerhard Jungling, Dusseldorf (DE)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 15/360,460

(22) Filed: Nov. 23, 2016

(65) Prior Publication Data
US 2017/0151863 A1 Jun. 1, 2017

(30) Foreign Application Priority Data
Nov. 26, 2015 (EP) ..................................... 15196556

(51) Int. Cl.
| | |
|---|---|
| *B60J 7/057* | (2006.01) |
| *B60J 7/043* | (2006.01) |
| *B60J 7/053* | (2006.01) |
| *B60J 7/19* | (2006.01) |
| *B60J 7/02* | (2006.01) |

(52) U.S. Cl.
CPC ............. *B60J 7/0435* (2013.01); *B60J 7/024* (2013.01); *B60J 7/053* (2013.01); *B60J 7/057* (2013.01); *B60J 7/192* (2013.01)

(58) Field of Classification Search
CPC ................................. B60J 7/057; B60J 7/0435
USPC ................................ 296/216.02–216.05, 223
See application file for complete search history.

(56) References Cited

U.S. PATENT DOCUMENTS

| | | |
|---|---|---|
| 4,699,421 A | 10/1987 | Schaetzler et al. |
| 5,069,501 A | 12/1991 | Baldwin et al. |
| 5,531,501 A | 7/1996 | Nabuurs |
| (Continued) | | |

FOREIGN PATENT DOCUMENTS

| | | |
|---|---|---|
| DE | 4238945 C1 | 11/1993 |
| DE | 19635145 C1 | 10/1997 |
| (Continued) | | |

OTHER PUBLICATIONS

European Search Report for European patent application No. EP15196556, dated Apr. 22, 2016.

*Primary Examiner* — Dennis H Pedder
(74) *Attorney, Agent, or Firm* — Steven M. Koehler; Westman, Champlin & Koehler, P.A.

(57) ABSTRACT

An open roof construction for a vehicle includes a closure element supported by an operating mechanism. The operating mechanism comprises a driving slide, slidably guided in a guide rail, a front support attached to the closure element and guided by the guide rail, a support member which is slidably connected to the closure element, and a curve part on the stationary part including a guide track having a vertical component and extending rearwardly beyond a rear edge of the roof opening. The guide rail, driving slide, connecting element, support member and curve part on the stationary part are positioned outside the seal between the closure element and the stationary part. The connecting element is connected to the driving slide and support member in a manner such that it is movable at least partly in substantially vertical direction with respect to the guide rail.

16 Claims, 9 Drawing Sheets

(56) References Cited

U.S. PATENT DOCUMENTS

| | | | |
|---|---|---|---|
| 5,618,081 A | 4/1997 | Nabuurs | |
| 6,158,803 A | 12/2000 | Reihl et al. | |
| 6,419,309 B1 | 7/2002 | Kaandorp et al. | |
| 6,494,529 B1 | 12/2002 | Manders | |
| 6,568,750 B2 | 5/2003 | Radmanic et al. | |
| 6,572,183 B2 | 6/2003 | Wingen et al. | |
| 6,619,732 B2 | 9/2003 | Radmanic | |
| 6,942,285 B2 | 9/2005 | Manders et al. | |
| 8,991,911 B2 * | 3/2015 | Nabuurs | B60J 7/053 296/216.03 |
| 9,266,415 B1 * | 2/2016 | Nellen | B60J 7/024 |
| 2003/0141748 A1 | 7/2003 | Manders et al. | |
| 2016/0207381 A1 * | 7/2016 | Holzel | B60J 7/0435 |

FOREIGN PATENT DOCUMENTS

| | | |
|---|---|---|
| DE | 102013013587 A1 | 2/2015 |
| EP | 0403388 A1 | 12/1990 |
| EP | 0657316 A1 | 6/1995 |
| EP | 1052126 A1 | 11/2000 |
| EP | 1331119 A1 | 7/2003 |
| JP | 2012091575 A | 5/2012 |
| WO | 2015024944 A | 2/2015 |

* cited by examiner

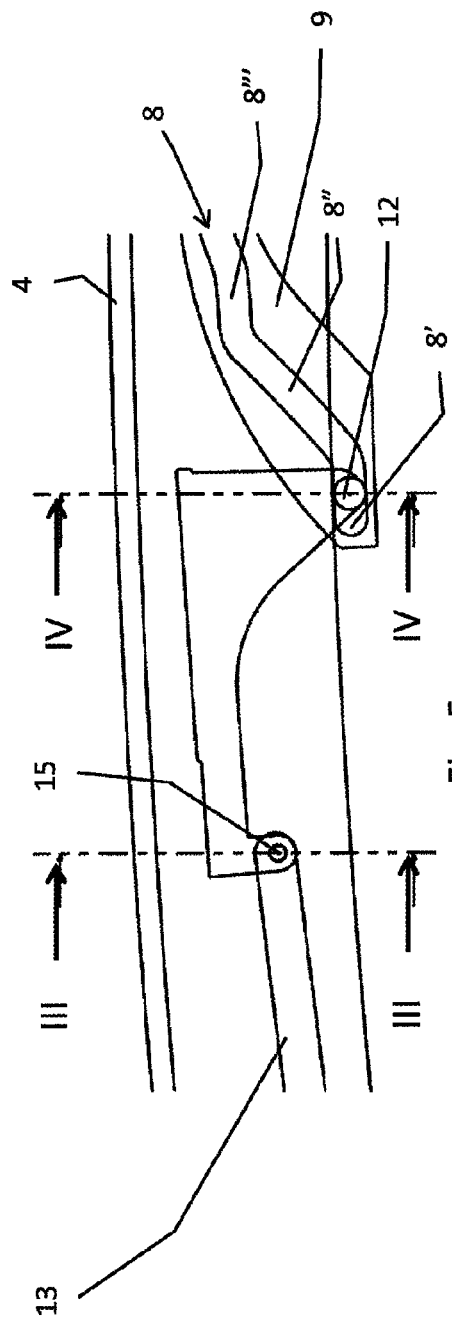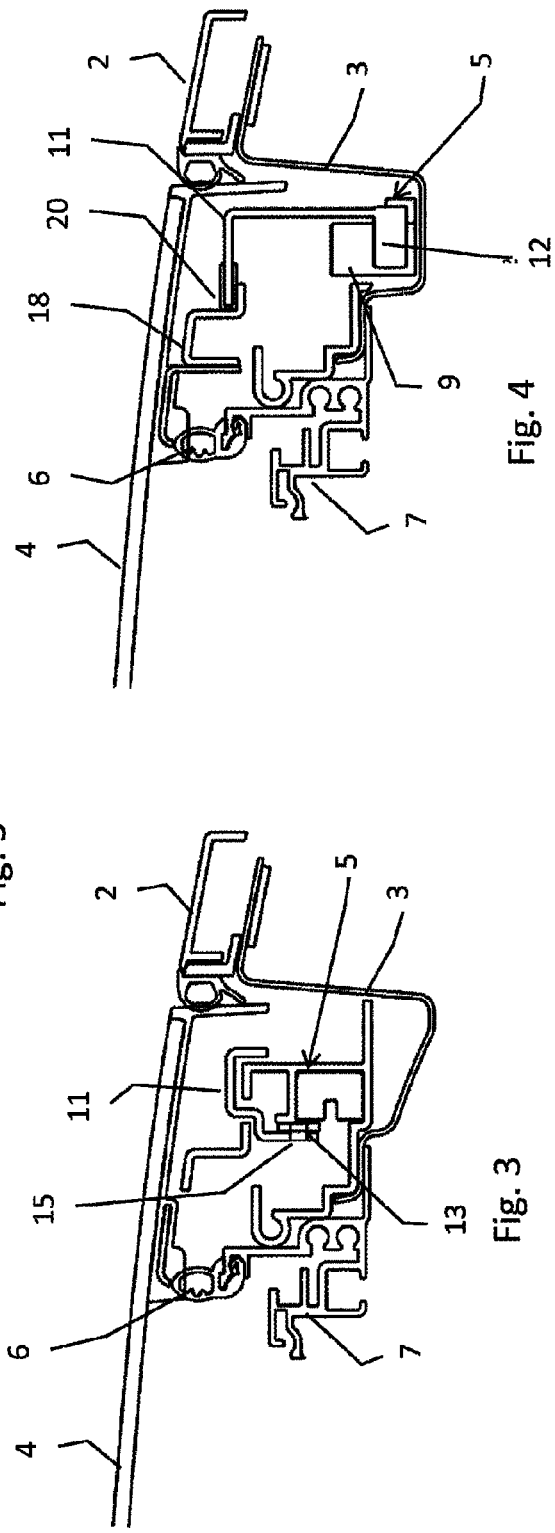

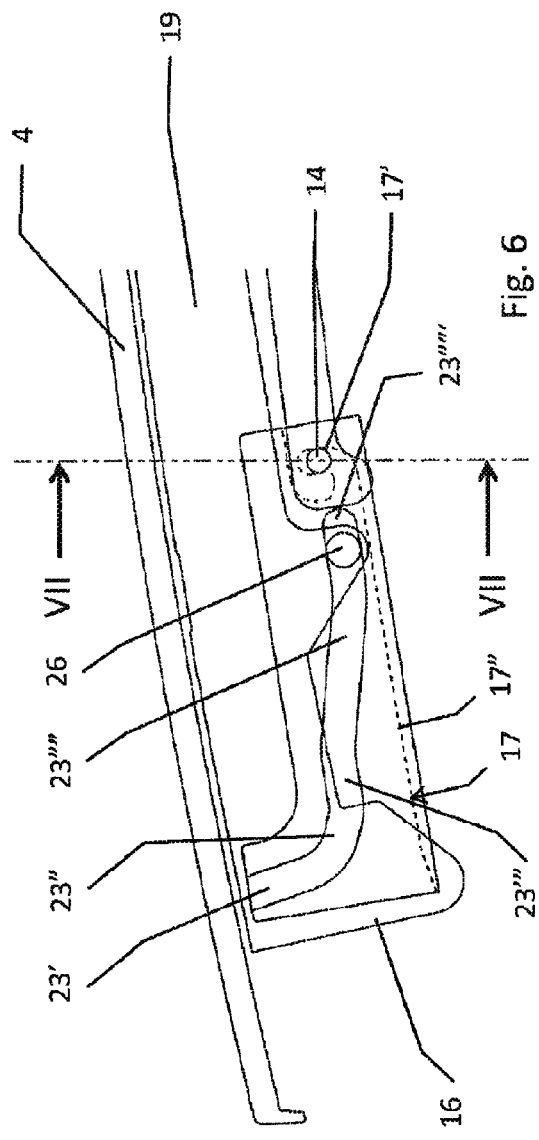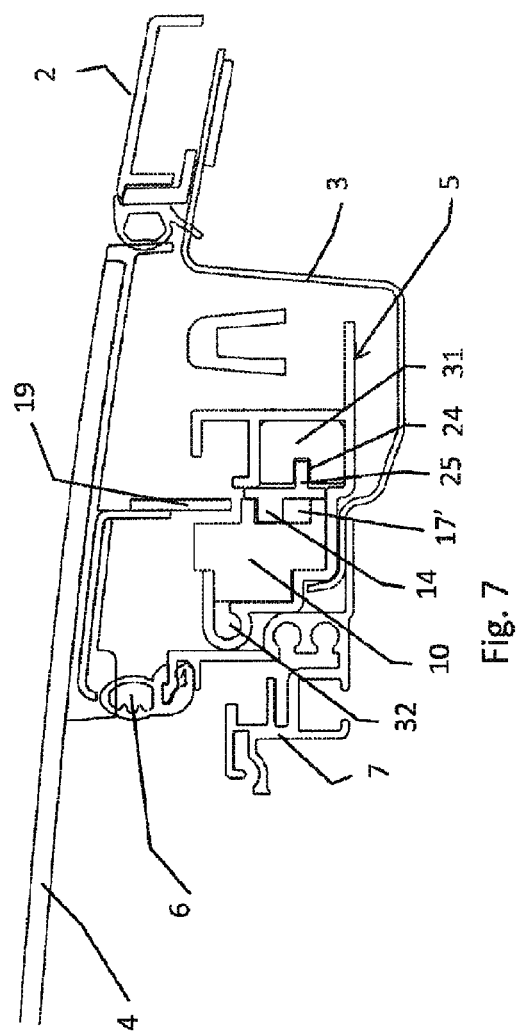

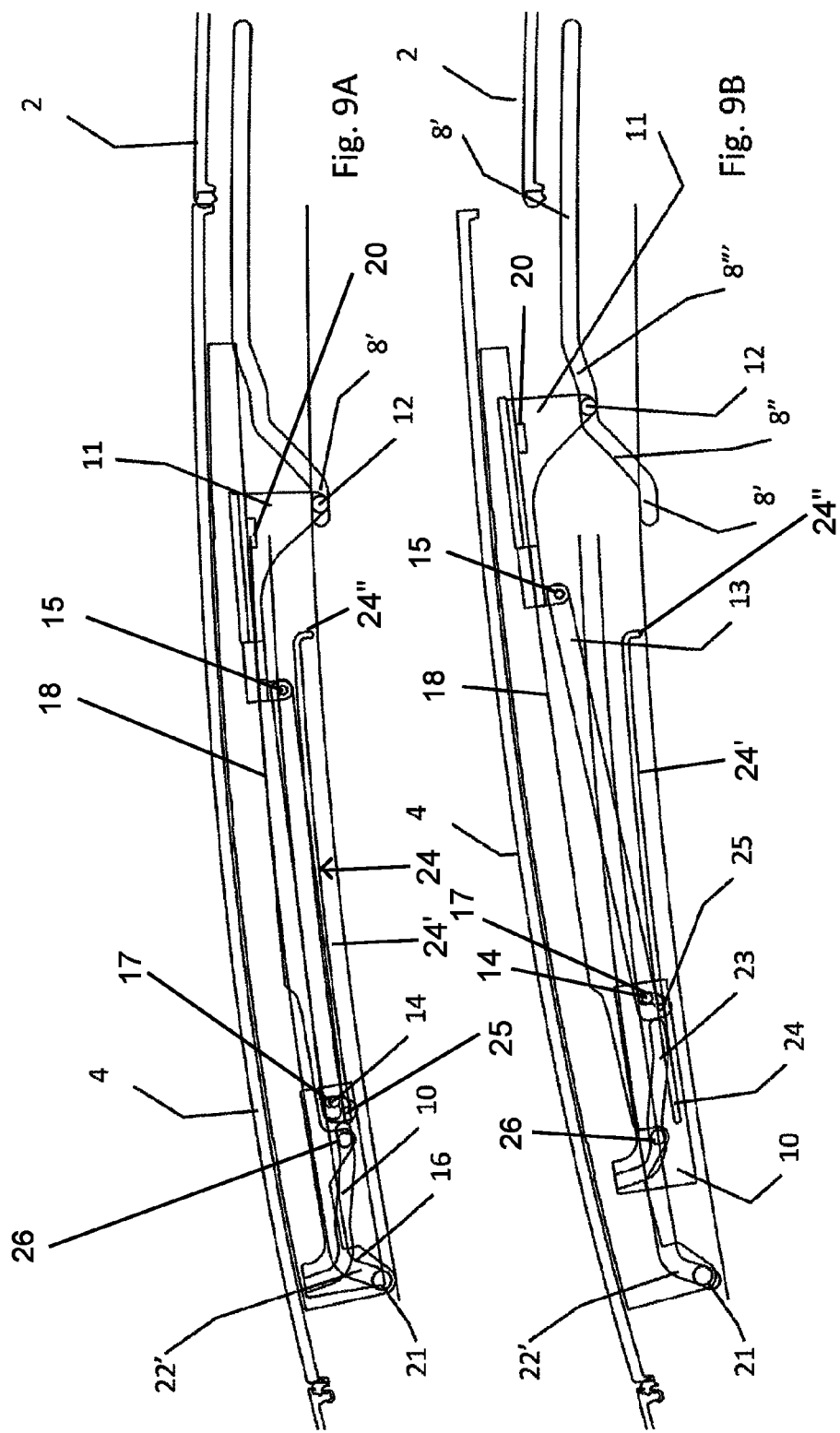

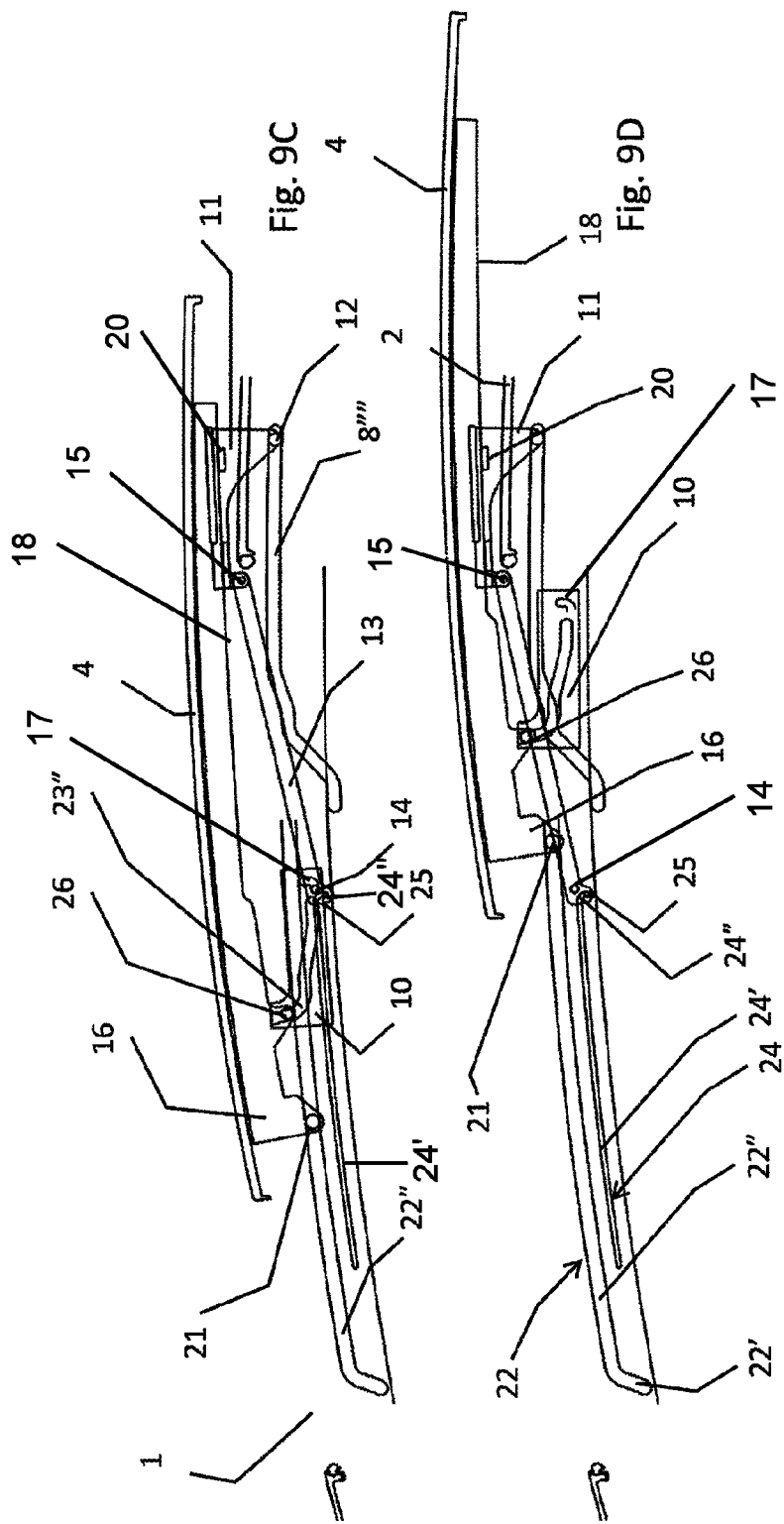

OPEN ROOF CONSTRUCTION FOR A VEHICLE

BACKGROUND

The discussion below is merely provided for general background information and is not intended to be used as an aid in determining the scope of the claimed subject matter. The present invention relates to an open roof construction for a vehicle having an opening in the fixed roof, comprising a stationary part for attachment to the roof, having at least one guide rail on a side of the roof opening, a closure element supported by an operating mechanism and adjustable between a closed position, in which it closes the roof opening by means of a seal between the closure element and the stationary part, and an open position. The operating mechanism comprises a driving slide, slidably guided in the guide rail, a front support attached to the closure element and guided by the guide rail, a support member which is slidably connected to the closure element, and a curve part on the stationary part including a guide track having a vertical component and extending rearwardly beyond a rear edge of the roof opening. The support member is in engagement with said guide track. The driving slide is configured to drive the support member at least along part of the path of movement of the closure element by means of a connecting element.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they in-tended to be used as an aid in determining the scope of the claimed subject matter. The claimed subject matter is not limited to implementations that solve any or all disadvantages noted in the Back-ground.

An aspect of the invention is a open roof construction or roof assembly where the guide rail, driving slide, connecting element, support member and curve part on the stationary part are positioned outside the seal between the closure element and the stationary part, and the connecting element is connected to the driving slide and support member in a manner such that it is movable at least partly in substantially vertical direction with respect to the guide rail.

Due to the fact that both the driving slide and the support member are positioned in the wet portion of the open roof construction outside the seal of the closing element, it is not necessary to guide the connecting element through a seal, so that the connecting element can be moved in height direction and thus, there is more freedom to design the support member and the connecting element, the points of attachment thereof, as well as their movements.

According to a particular embodiment, the support member is only slidable with respect to the closure element, wherein preferably the support member is slidably engaged with a guide track on the closure element by a plurality of sliding surfaces, preferably fully enclosing the guide track.

This leads to a very stable support of the rear side of the closure element, and the tendency to slant is reduced substantially, in comparison to a closure element which is supported by a tilting lever.

If the open roof construction is of the type in which the closure element is first tilted from the closed position to an inclined venting position and then moved rearwardly above the fixed roof, the support member may be slidable with respect to the closure element when the closure element is tilted between the closed and venting positions.

The sliding movement of the support member enables the closure element to only tilt, without a simultaneous sliding movement.

Additionally, the closure element is slidable with respect to the support member when the support member is in its most rearward position.

This enlarges the percentage of the roof opening that is released by the closure element, without needing to move the support member too much in rearward direction.

The front support of the closure element may be provided with a front guide shoe which is guided in a stationary guide curve, the driving slide then being drivably engaged with the front support through engagement between a sliding member and a movable guide curve, the shapes of the stationary and movable guide curves are such that the driving slide moves with respect to a substantially stationary front guide shoe when the closure element is tilted between the closed and venting positions, while the driving slide and the front support move as a unit when the closure element is moved between the venting and open positions.

The driving slide is connected to the connecting element through a coupling arrangement which couples the connecting element to the driving slide until the support member reaches its most rearward position, and couples the connecting element to the guide rail when the closure element slides with respect to the support member.

In one embodiment, the driving slide is slidable to a most rearward position, which is rearwardly of a front end of the guide track of the curve part.

This is enabled by the arrangement of both the driving slide and the curve part in the wet part of the mechanism, i.e. outside the seal, so that the closure element can be displaced maximally rearwardly.

The support member is in engagement with the guide track of the curve part through a single slide shoe.

This enables the support member to be rotationally fixed with respect to the closure element and still accommodate the tilting movements of the closure element and therefore the support member with respect to the guide track of the curve part.

The slide shoe may be provided near the rear end of the support member, whereas the connecting element may be connected to the front end of the support member.

This leads to the simplest configuration of these parts.

The connecting element may be pivotable with respect to the driving slide and to the support member in order to follow the tilting movements of the closure element and support member.

In an alternative embodiment, the support member comprises a lever, which is pivotable with respect to the closure element and which is in engagement with the guide track of the curve part through two spaced slide shoes.

BRIEF DESCRIPTION OF THE DRAWINGS

Aspects of the invention will be elucidated hereafter with reference to the drawings showing embodiments of the open roof construction.

FIGS. 3 and 4 are cross sectional views along the lines III-III and IV-IV, respectively, in FIG. 5.

FIG. 5 is an enlarged longitudinal sectional view of the support member for the closure element and connected parts.

FIG. 6 is a view corresponding to FIG. 5, but showing the front support for the closure element and connected parts.

FIG. 7 is a cross sectional view along the line VII-VII in FIG. 6.

FIGS. 9A-9D are longitudinal sectional views of the closure element and its operating mechanism in 4 different positions.

DETAILED DESCRIPTION OF THE ILLUSTRATIVE EMBODIMENTS

Figure 1:
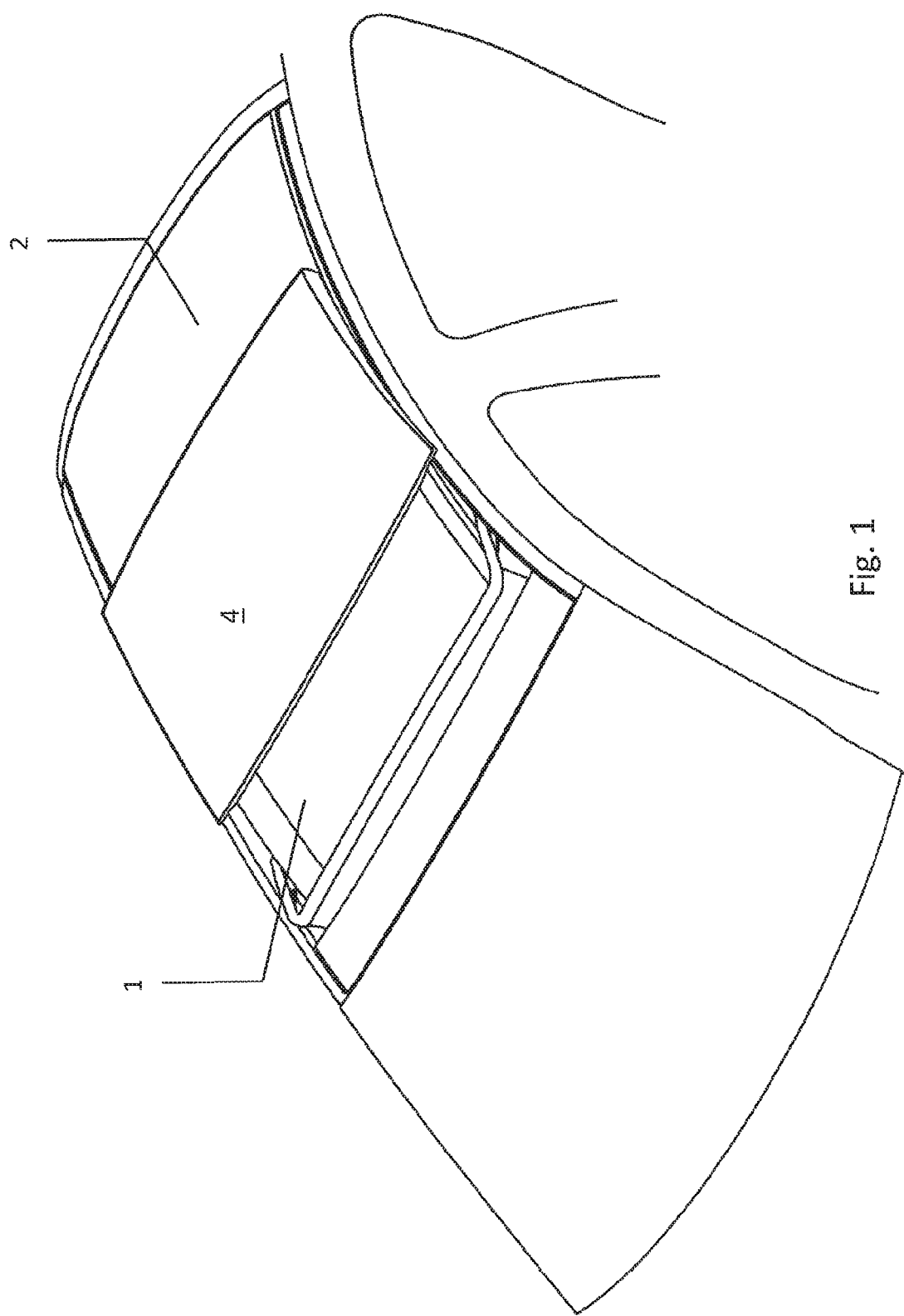
FIG. 1 is a perspective view of a vehicle roof comprising an open roof construction.
Figure 2A:
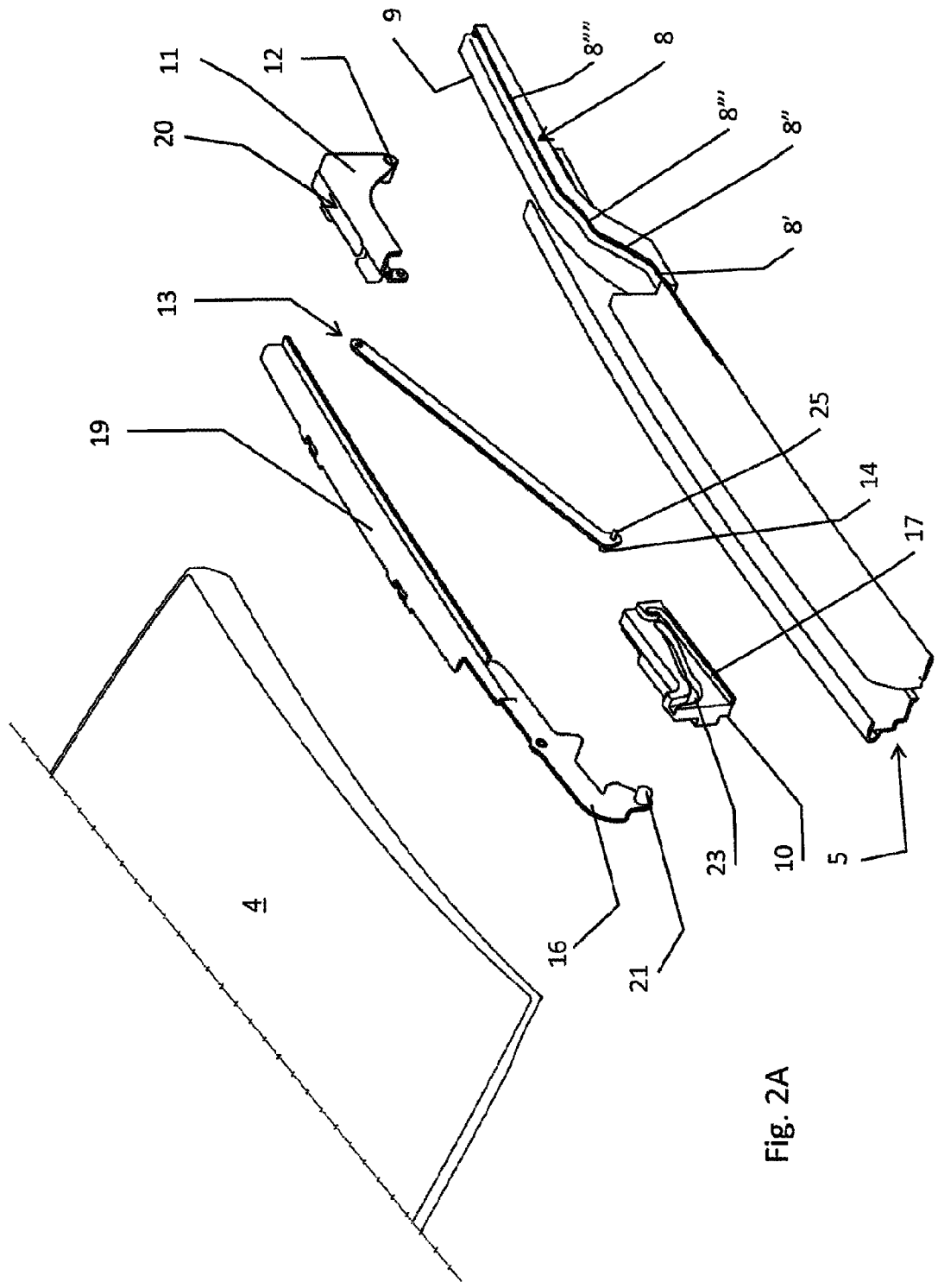
FIGS. 2A, 2B are perspective exploded views of the closure element and parts of the operating mechanism on one side of the closure element, as seen from two different sides.
Figure 2B:
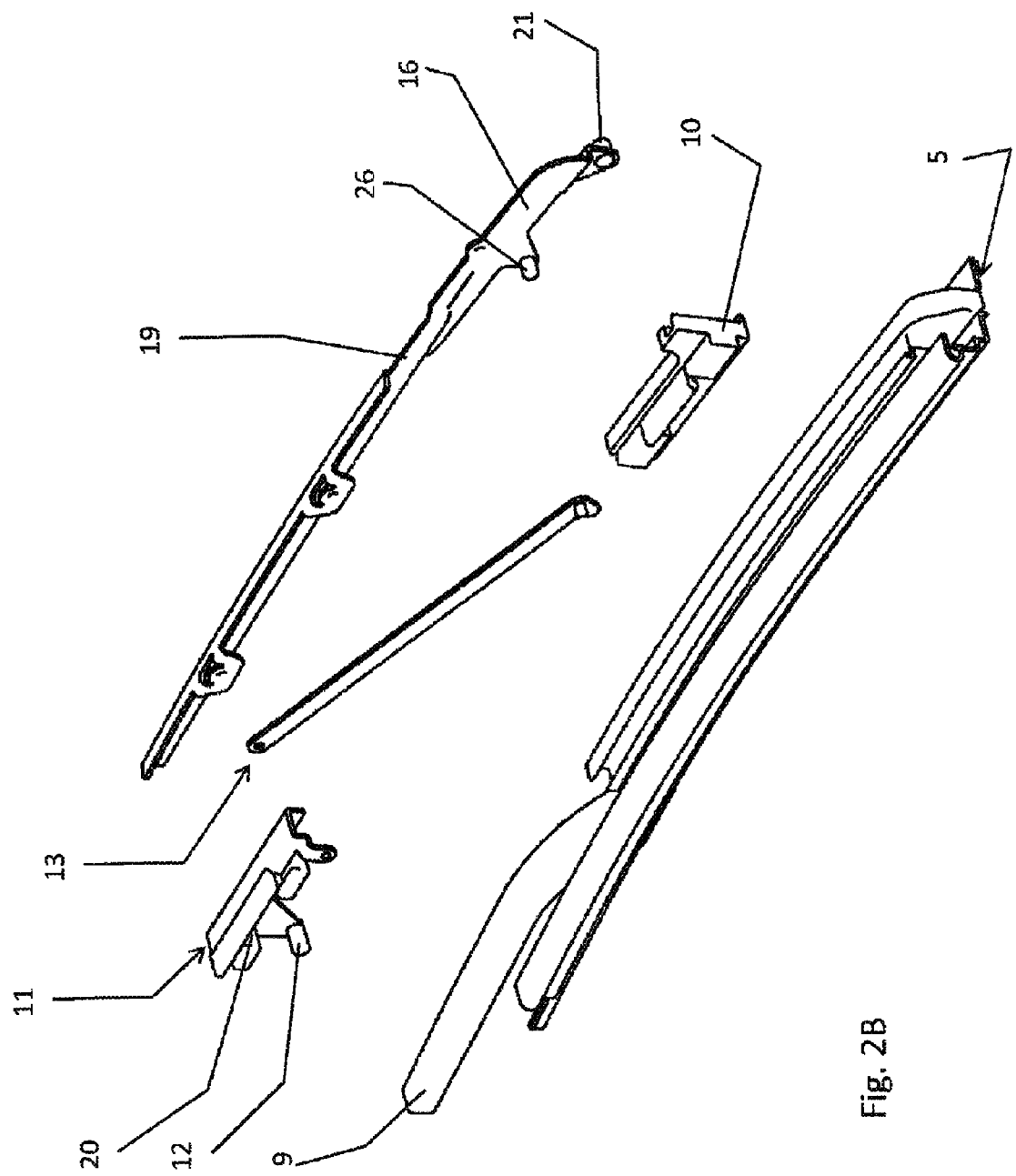
Figure 8:
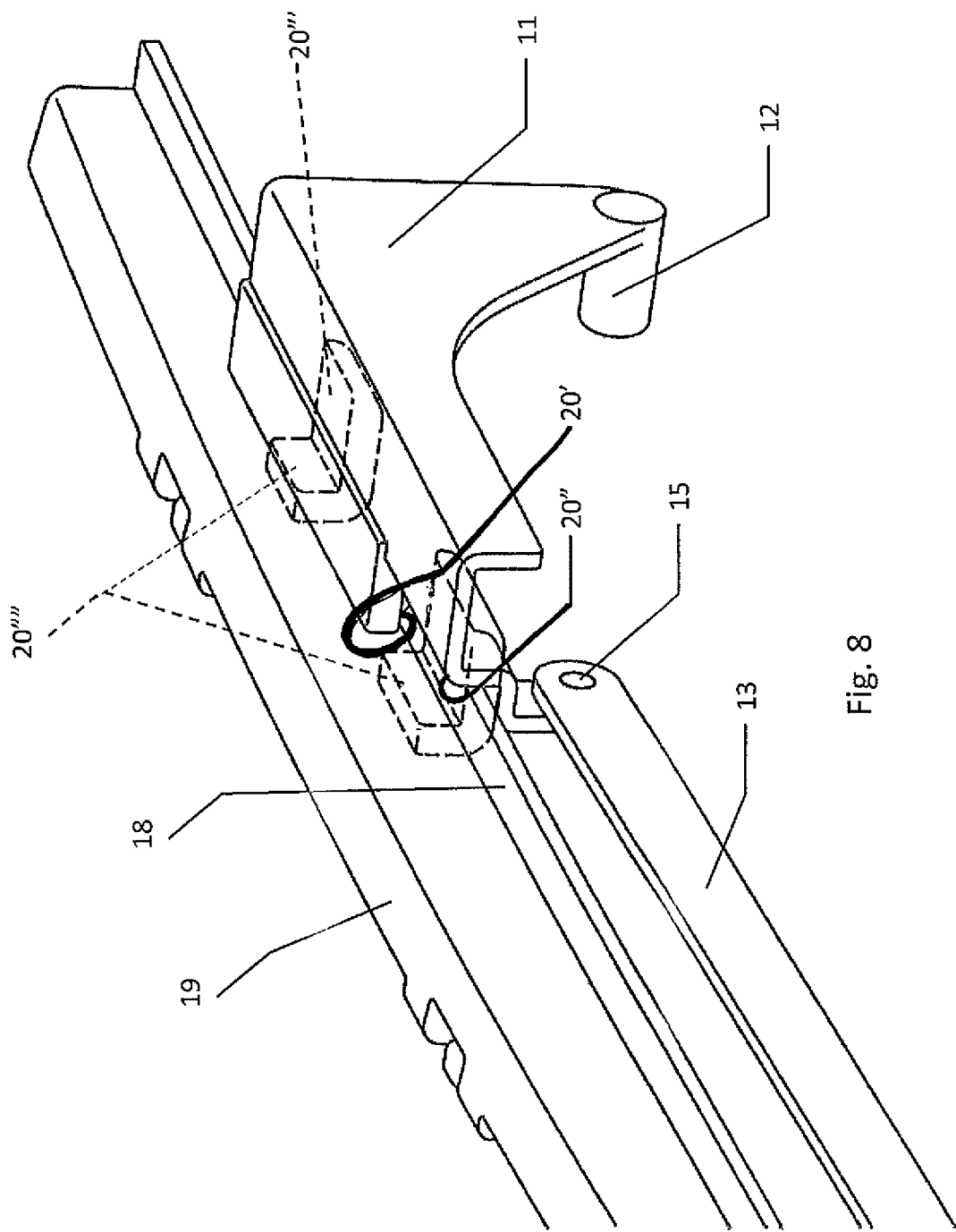
FIG. 8 is an enlarged perspective view of the support member for the closure element and some connected parts.

The drawings, in particular FIGS. 1-9, show an embodiment of an open roof construction for a vehicle, in particular a motor vehicle such as a passenger car. As is shown in FIG. 1, this vehicle is provided with an opening 1 in its fixed roof 2, whereby it is noted that said fixed roof 2 may either form part of the vehicle or of the open roof construction itself, which in that case makes up the entire roof of the vehicle. The fixed roof 2 may consist of an integral part of the vehicle or of one or more (transparent) panels, which may be removable or form a separate adjustable roof element.

The open roof construction or roof assembly comprises a stationary part, such as a frame 3 (FIG. 3, 4), and a closure element, in this case in the form of a rigid and preferably transparent panel 4, for example made of glass or of plastic material, which is movably supported by frame 3. In this embodiment, panel 4 is movable between a closed position, in which roof opening 1 is closed and panel 4 is at least substantially coplanar with fixed roof 2, and an open position, in which panel 4 occupies a rearward position, at least partially above fixed roof 2, in which a very large part of opening 1 is cleared. In the embodiment shown, panel 4 is first tilted to a venting position in which the rear edge of panel 4 is moved upwardly, and then moved rearwardly to positions above fixed roof 2.

An operating mechanism is provided on each longitudinal side of panel 4 for effecting the movements of panel 4. The drawings show only parts on one side of the roof, but it should be kept in mind that similar parts are arranged in mirror image on the other side as well. The mechanism is driven by a drive unit including a drive element, such as a drive cable (not shown, only a cable guide 32 is shown in FIG. 7) and a manual actuator, such as a crank, or a motor such as an electric motor, for driving the cable. The operating mechanism supports panel 4 and is at least partially guided in a guide rail 5 (see FIG. 3, 4), which forms part of or is mounted on frame 3. The guide rail 5 extends along the side edge of roof opening 1, at a lower level than fixed roof 2. Each guide rail 5 for the operating mechanism for panel 4 is arranged outwardly (i.e. away from the center of the vehicle) of a seal 6 on frame 3 cooperating with the lower side of panel 4 to prevent the ingress of water into the interior of the vehicle. The guide rails 5 are therefore positioned in the so-called wet portion of open roof construction, outside seal 6. Guide rails 7 inside seal 6 are intended to guide other parts such as a sunshade.

Furthermore, a rear guide track 8 on a curve part 9 (FIGS. 2A, 2B, 5, 9) is provided, also in the wet portion, extending from a position forwardly of the rear edge of roof opening 1 to a position rearwardly of roof opening 1, i.e. just below fixed roof 2 and on both lateral sides of fixed roof 2. A passage opening (not shown) should connect the guide track below the fixed roof 2 with the space above fixed roof 2, which is well known in the art. The guide track 8 comprises a short front portion 8' parallel to guide rail 5, a rearwardly connected, rearwardly and upwardly inclined portion 8", a very short parallel and then upwardly inclined portion 8''' and then a longer substantially parallel portion 8'''', although in this case it extends slightly downwardly.

The guide rails 5 extend so far rearwardly parallel to the longitudinal curvature of fixed roof 2, that it extends beyond the front end of guide track 8 (but not beyond the rear edge of roof opening 1 so that the open roof construction can be mounted from above through roof opening 1). Therefore, guide rail 5 and guide track 8 should be offset, so that guide rail 5 and guide track 8 can run alongside each other (see e.g. FIGS. 2, 4).

The guide rail 5 slidably receives a driving slide 10 which is engaged by the drive cable in cable guide 32 so as to adjust panel 4. For this purpose driving slide 10 is connected, at least during a part of the movements of panel 4, to a support member 11 which supports panel 4 and which is slidably guided in guide track 8 by means of a slide shoe 12. In this case guide track 8 is in the form of a slot and slide shoe 12 in the form of a pin engaging into the slot, but other track/slide shoe combinations are conceivable. The advantage of a single pin in a slot is that support member 11 may be tilted with panel 4 while guide shoe/pin 12 may then rotate in the slot of guide track 8.

As support member 11 moves with panel 4 in vertical sense, driving slide 10 is connected to support member 11 by means of a connecting element 13 which can adapt to this vertical movements. In this embodiment, connecting element 13 is pivotally connected to driving slide 10 and to support member 11 by means of a pivot 14, 15 respectively extending horizontally in transverse direction. The connecting element 13 in this case connects to the front end of support member 11 and to the rear end of driving slide 10, at least when driving slide 10 drives support member 11.

The driving slide 10 does not drive support member 11 during all movements of panel 4. In this embodiment, driving slide 10 drives support member 11 during movements of panel 4 from the closed position to the venting position and a first part of a rearward sliding movement of panel 4. As support member 11 has reached its rearmost position in guide track 8, driving slide 10 will be decoupled from connecting element 13 and will be coupled to a front support 16 of panel 4.

The coupling between pivot 14 of connecting element 13 and driving slide 10 is formed by a curved slot 17, consisting of a substantially vertical rear locking portion 17' and a front portion 17" extending substantially parallel to guide rail 5 and having an open front end. The rear locking portion 17' of curved slot 17 extends to a position corresponding in height to a long parallel portion 24' of a guide rail slot 24 with which a pin 25 of connecting element 13 is in engagement to lock pivot 14 in locking portion 17'. A downward locking portion 24" of guide rail slot 24 allows pivot 14 to move downwards to a position in which pivot 14 of connecting element 13 is free to move in front portion 17" of curved slot 17 of driving slide 10 and in which pin 25 is locked in locking portion 24" of guide rail slot 24 and thus locked with respect to guide rail 5. Consequently, support member 11 remains stationary when driving slide 10 moves further rearwardly. The guide rail slot 24 is formed in a plastic insert 31 in guide rail 5 (FIG. 7).

The support member 11 is slidably connected to panel 4 by means of a panel track 18 (FIG. 4, 8), here in the form of a lateral flange, extending from a bracket 19 below the glass panel and parallel thereto. The support member 11 is provided with a plurality of sliding surfaces 20 engaging panel track 18 in a very stable manner, allowing support member 11 to slide with respect to panel 4 without the risk of slanting or other unwanted movements, when support member 11 is driven by driving slide 10 to move panel 4 to the venting position. It also allows panel 4 to slide with respect to support member 11 when support member 11 is locked to guide rail 5 and panel 4 is driven by driving slide 10 through front support 16.

In the embodiment shown, support member 11 has the following sliding surfaces: a long upper sliding surface 20' engaging the upper side of panel track 18, a vertical outer sliding surface 20" engaging the edge of the flange shaped panel track 18, two lower, spaced sliding surfaces 20'" engaging the lower side of the panel track 18 and two vertical inner sliding surfaces 20"" substantially opposite the outer sliding surfaces 20" and engaging a vertical sliding surface of bracket 19. The panel track 18 is therefore fully enclosed by the sliding surfaces 20 preventing or at least reducing any unwanted movements, rattling noises, bending of panel 4, wear of guide tracks 8, 18 and/or undesirable motor driving noises, when in dynamic driving conditions.

The front support 16 is provided with a slide shoe 21 (FIGS. 2A, 2B, 9) which is pivotally and slidably guided in a guide track 22 of guide rail 5. This guide track 22 has a rearwardly and upwardly inclining, short front portion 22' and a long rear portion 22" parallel to guide rail 5 (FIG. 9D). The driving slide 10 is in engagement with front support 16 by means of a pin-slot connection. In this case, a slot or curve 23 is formed in driving slide 10 and a pin 26 is formed on front support 16 rearwardly spaced from front support slide shoe 21. The slot 23 in driving slide 10 comprises an upward front locking portion 23', a rearward bend 23" at the bottom end of locking portion 23', and then a parallel (to guide rail 5) portion 23'", a downwardly and rearwardly inclined portion 23"" and a parallel rear portion 23""'.

The operation of the operating mechanism of panel 4 will now be described with reference to FIGS. 9A-9D.

In FIG. 9A panel 4 is in the closed position. The driving slide 10 is in its front position. The pivot 14 of connecting element 13 is locked in locking portion 17' of driving slide slot 23, whereas pin 26 of front support 16 is positioned at the rear end of slot 23 in driving slide 10 (FIG. 6). The slide shoe 21 of front support 16 is positioned in the downward end of inclined front portion 22' of guide track 22. The slide shoe 12 of support member 11 is in engagement with front end portion 8' of guide track 8 and slide shoes 20 of support member 11 are in their front position with respect to panel track 18.

In the position of FIG. 9B, driving slide 10 is moved a distance rearwardly and panel 4 is pivoted to the venting position in which the rear edge of panel 4 is lifted. The support member 11 is displaced as a unit together with driving slide 10 due to the connection by pivoting connecting element 13, thereby urging support member 11 to slide along guide track 8 of curve part 9 and panel guide track 18. Depending on the shape and direction of guide track 8 the rear side of panel 4 will be lifted by support member 11, in particularly when it is moved along inclined portion 8" of guide track 8 which extends under an angle with respect to stationary guide rail 5. The support member 11 is allowed to pivot with respect to guide track 8 and with respect to connecting element 13 in order to allow support member 11 to move in a vertical direction when panel 4 is tilted. The slide shoe 12 has reached the very short parallel portion 8'" in guide track 8.

When driving slide 10 is moved rearwardly while front support slide shoe 21 is almost stationary in longitudinal direction due to the engagement of slide shoe 21 in inclined portion 22' of guide track 22, slot 23 in driving slide 10 will move with respect to pin 26 on front support 16, so this will slide through slot 23 towards the front side of it. Slot 23 inclines upwardly in portion 23'" (FIG. 6), and as a result, slide shoe 21 of front support 16 will be lifted in inclined portion 22' of guide track 22. Due to this inclination of front portion 22' slide shoe 21 is displaced not only upwardly, but also slightly rearwardly. The front side of panel 4 is hence moved away from the front edge of roof opening 1.

At the same time, pin 26 of front support 16 has arrived through bend 23" in vertical locking portion 23' of slot 23 in driving slide 10, so that pin 26 and therefore front support 16 are locked with respect to driving slide 10. As front support slide shoe 21 has arrived in parallel portion 22" of guide track 22, front support 16 is able to follow a further rearward movements of driving slide 10.

FIG. 9D shows that during this further rearward movement, panel 4 slides relative to support member 11 due to panel track 18 sliding along support member slide shoes 20. The panel 4 can thus be moved further rearward and roof opening 1 can be opened to a large extent, without having to extend rear guide track 8 further rearwardly.

Closing of panel 4 is effected by displacing driving slide 10 in the forward direction again. The different movements as described before are performed in opposite direction and in the reversed order.

Figure 10:
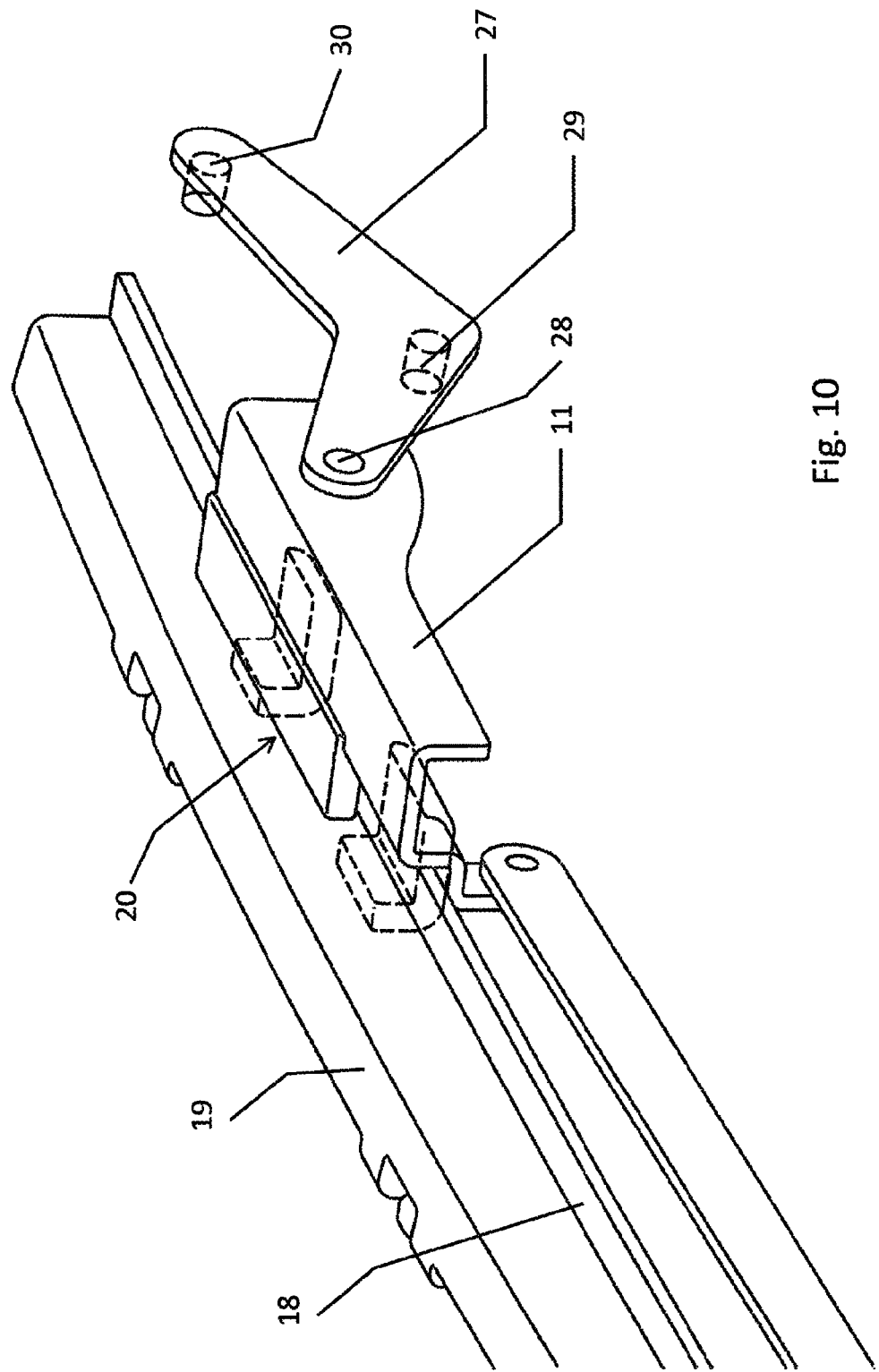
FIG. 10 is a view corresponding to that of FIG. 8 but showing an alternative embodiment.

FIG. 10 shows an alternative embodiment in which support member 11 is provided with an additional support lever 27, which is pivotally connected to support member 11 through a pivot 28 and which is slidably in engagement with rear guide track 8 through two spaced slide shoes 29, 30. These slide shoes 29, 30 will follow the curves of rear guide track 8 and lever 27 will thus rotate during its travel which might increase the tilting height of panel 4 and/or reduce the required height difference in rear guide track 8.

From the foregoing it will be clear that the invention provides a very stable support for the panel and allows a large sliding movement of the panel through controllable driving slide displacements. Difficulties with the seal of the panel are avoided by positioning all driving elements in the wet portion of the open roof construction. This arrangement of all panel operating mechanism parts in the wet portion also maximizes the guide rail length, and minimizes the lateral width of the mechanism as all parts can be arranged close to each other, allowing a larger passage opening in the frame. The relatively short rear guide track behind the roof opening does not lead to a smaller panel displacement (compared to a top slider roof) due to the fact that the panel may slide with respect to the rear support member, thus forming a hybrid mechanism. The relatively short rear guide track leads to design advantages as the short straight track will hardly interfere with the curved lateral contour of the fixed roof, which is the case with longer rear guide tracks of a top slider roof.

The invention is not limited to the embodiment shown in the drawing and described above which may be varied in different manners within the scope of the appended claims. For example, movable connections may be replaced by other engagements between a track or curve and a sliding or rolling member. Slide shoe has a broad meaning, i.e. any part that may slide with respect to a track or rail. In an extreme case, the rear guide track may terminate before the rear edge of the roof opening, making the roof more a spoiler roof instead of a top slider.

What is claimed is:

1. An open roof construction for a vehicle having a roof opening in a fixed roof, comprising:
   a stationary part for attachment to the fixed roof, having at least one guide rail on a side of the roof opening;
   a closure element;
   an operating mechanism supporting the closure element and adjustable between a closed position, in which the closure element closes the roof opening with a seal between the closure element and the stationary part, along a path of movement to an open position, wherein the operating mechanism comprises:
   a driving slide slidably guided in the guide rail;
   a front support attached to the closure element and guided by the guide rail;
   a support member slidably connected to the closure element; and
   a curve part on the stationary part including a guide track having a vertical component and extending rearwardly beyond a rear edge of the roof opening, the support member being in engagement with said guide track, wherein the driving slide is configured to drive the support member at least along part of the path of movement of the closure element by a connecting element;
   wherein the guide rail, driving slide, connecting element, support member and curve part on the stationary part are positioned outside the seal between the closure element and the stationary part, and in that the connecting element is connected to the driving slide and support member in a manner such that it is movable at least partly in a substantially vertical direction with respect to the guide rail.

2. The open roof construction according to claim 1, wherein the support member is only slidable with respect to the closure element.

3. The open roof construction according to claim 2, wherein the closure element includes a guide track and the support member includes a plurality of sliding surfaces that slidably engage the guide track.

4. The open roof construction according to claim 2, wherein the operating mechanism is configured where the closure element is first tilted from the closed position to an inclined venting position and then moved rearwardly above the fixed roof.

5. The open roof construction according to claim 4, wherein the support member is slidable with respect to the closure element when the closure element is tilted between the closed and venting positions.

6. The open roof construction according to claim 2, wherein the closure element is slidable with respect to the support member when the support member is in its most rearward position.

7. The open roof construction according to claim 2, wherein the front support of the closure element is provided with a front guide shoe which is guided in a curved slot of the guide rail, the driving slide being drivably engaged with the front support through engagement between a sliding member and a movable guide curve, wherein shapes of the curved slot and the movable guide curve are such that the driving slide moves with respect to the front guide shoe, which is substantially stationary when the closure element is tilted between the closed and venting positions, while the driving slide and the front support move as a unit when the closure element is moved between the venting and open positions.

8. The open roof construction according to claim 7, wherein the driving slide is connected to the connecting element through a coupling arrangement which couples the connecting element to the driving slide until the support member reaches its most rearward position, and couples the connecting element to the guide rail when the closure element slides with respect to the support member.

9. The open roof construction according to claim 1, wherein the driving slide is slidable to a most rearward position, which is rearwardly of a front end of the guide track of the curve part.

10. The open roof construction according to claim 1, wherein the support member is in engagement with the guide track of the curve part through a single slide shoe.

11. The open roof construction according to claim 10, wherein the support member has a front end and a rear end, the slide shoe being provided near the rear end of the support member, whereas the connecting element being connected to the front end of the support member.

12. The open roof construction according to claim 1, wherein the connecting element is pivotable with respect to the driving slide and to the support member.

13. The open roof construction according to claim 1, wherein the support member comprises a support lever, which is pivotable with respect to the closure element and which is in engagement with the guide track of the curve part through two spaced slide shoes.

14. The open roof construction according to claim 2, wherein the support member is slidably engaged with a guide track on the closure element by a plurality of sliding surfaces enclosing the guide track.

15. The open roof construction of claim 3 wherein two sliding surfaces of the plurality of sliding surfaces engage oppositely facing surfaces of the guide track.

16. The open roof construction of claim 15 wherein the guide track include two pairs of oppositely facing surfaces, and wherein a sliding surface of the plurality of sliding surfaces engage each surface of the two pairs of oppositely facing surfaces.

* * * * *